Dec. 29, 1925.

F. BRÜGGEMANN 1,567,704

ELECTRIC POWER TRANSMISSION GEAR

Filed July 5, 1924   5 Sheets-Sheet 1

Dec. 29, 1925.  1,567,704
F. BRÜGGEMANN
ELECTRIC POWER TRANSMISSION GEAR
Filed July 5, 1924   5 Sheets-Sheet 2

Inventor:
Franz Brüggemann
by
Lotka, Kehlenbeck & Farley
Attorneys.

Dec. 29, 1925.　　　　　　　　　　　　　　1,567,704
F. BRÜGGEMANN
ELECTRIC POWER TRANSMISSION GEAR
Filed July 5, 1924　　　5 Sheets-Sheet 3
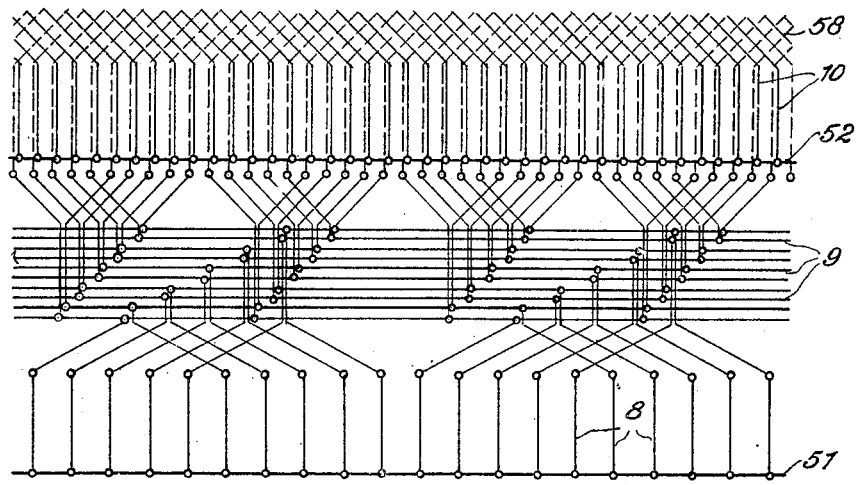
Fig. 5
Fig. 6
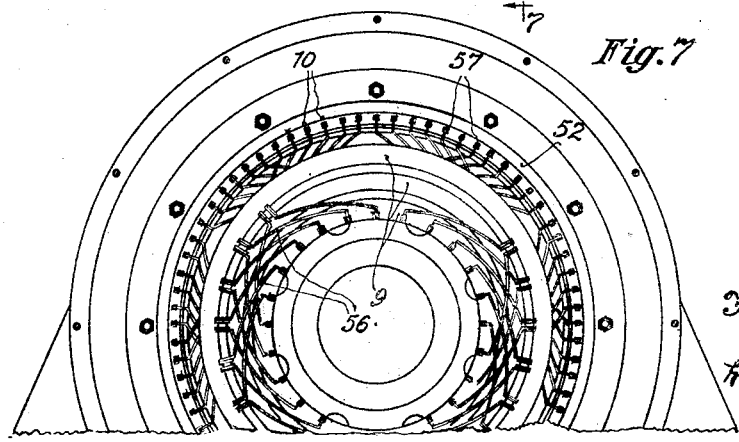
Fig. 7
Inventor:
Franz Brüggemann
by
Attorneys.

Dec. 29, 1925.

F. BRÜGGEMANN

ELECTRIC POWER TRANSMISSION GEAR

Filed July 5, 1924      5 Sheets-Sheet 4

1,567,704

Inventor:
Franz Brüggemann
by
Attorneys.

Dec. 29, 1925.            1,567,704
F. BRÜGGEMANN
ELECTRIC POWER TRANSMISSION GEAR
Filed July 5, 1924    5 Sheets-Sheet 5
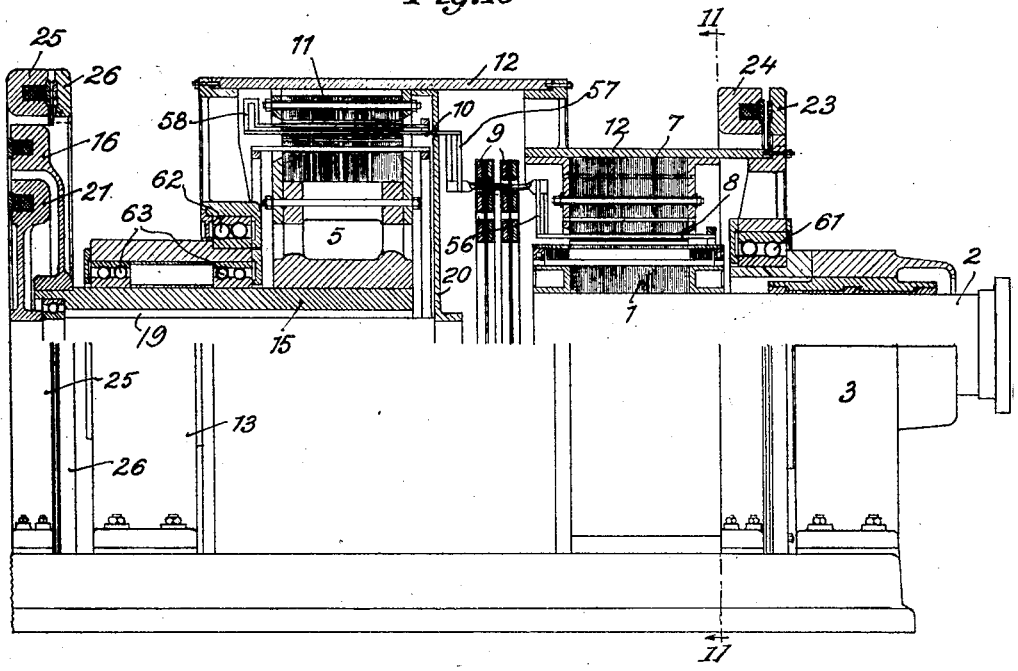
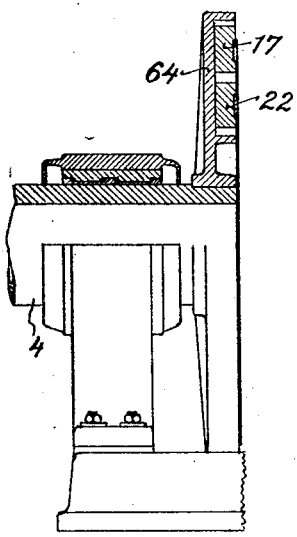
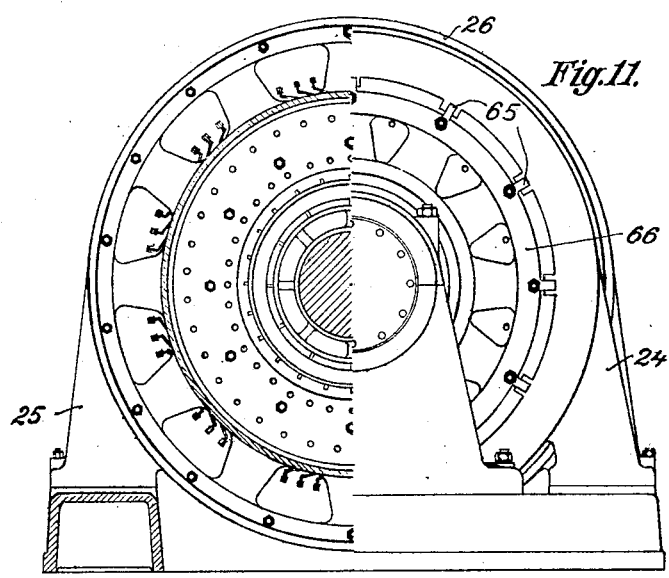
Inventor:
Franz Brüggemann
by
Attorneys Patented Dec. 29, 1925.

1,567,704

UNITED STATES PATENT OFFICE.

FRANZ BRÜGGEMANN, OF CHARLOTTENBURG, GERMANY.

ELECTRIC POWER-TRANSMISSION GEAR.

Application filed July 5, 1924. Serial No. 724,476.

*To all whom it may concern:*

Be it known that I, FRANZ BRÜGGEMANN, a citizen of Germany, and a resident of Charlottenburg, Germany, have invented certain new and useful Improvements in Electric Power-Transmission Gears (for which I have filed application in Germany, May 13, 1921), of which the following is a specification.

This invention relates to power transmission mechanism, and more particularly to an electrical speed reduction mechanism for transmitting power from a prime mover, such as a steam turbine, adapted to operate at a high rate of speed to a connected load, such as a ship's propeller adapted to operate efficiently at a reduced rate of speed.

An object of the invention is to provide a speed reduction mechanism which is adapted to change the speed ratio or the direction of rotation between a drive and driven shaft.

A further object of the invention is to provide a speed reduction mechanism consisting of an electric generator driven by the prime mover and an electric motor electrically connected to said generator and operatively connected to the load.

Another object is to utilize the inherent electrical characteristics of an alternating current generator of the revolving field type and a cage-type induction motor having their stator windings interconnected for low voltage polyphase operation.

Other objects of the invention will be apparent from the following description taken in conjunction with the accompanying drawings, in which:

Figure 1 is a side elevation with parts in section of one form of the motor-generator unit, Fig. 2 is a wiring diagram of the polyphase connections between the stators of a 4-pole induction motor and a 2-pole A. C. generator.

Fig. 3 is a wiring diagram of the polyphase connections between the stators of a 16-pole induction motor and a 4-pole A. C. generator, Figs. 4 and 5 are wiring diagrams similar to that in Fig. 3 and showing a modified arrangement of the conductor bars in the motor stator slots, Fig. 6 is an enlarged detail view of the structure illustrated in Fig. 1, Fig. 7 is a sectional elevation taken on the line 7—7 of Fig. 6, Fig. 8 is a side elevation on an enlarged scale of the ring assembly for interconnecting the stator windings, Fig. 9 is a sectional view taken on the line 9—9 of Fig. 8, Fig. 10 is an elevation with parts in section showing a motor-generator unit having rotatable stators and a plurality of electromagnetic clutches associated therewith, Fig. 10ª is a continuation of Fig. 10 showing the left hand bearing and clutch members of the unit.

Fig. 11 is a composite view, the right half being an end elevation of the generator and the left half being a sectional view taken on the line 11—11, of Fig. 10.

This invention consists broadly in an electrically and mechanically interconnected motor-generator unit of the alternating current type which is adapted to receive power through a shaft directly coupled to a high speed prime mover, such as a steam turbine, and to deliver the same power, less losses, through a second shaft to the load at a reduced speed.

In electrical speed reduction systems using a motor-generator set of the ordinary type it is essential to design the set for high potentials in order to transmit the power delivered by the prime mover to its load. To make provision for the heavy insulation and adequate cooling, required the use of large expensive constructions.

It is the purpose of the present invention to reduce the weight and size of the motor-generator unit to a minimum by transmitting the electrical energy from the generator to the motor at a minimum potential. This result is obtained by connecting the conductor bars of the generator stator individually to a ring system arranged in polyphase relation and to which the corresponding bars of the motor stator are directly connected. The ring system takes the place of the spool heads used in machines where the number of phases is small and the bars of like phase are connected in series. The rings also serve for balancing and equi-potential connections. Each bar, in a separate slot, is joined to a ring, and in multi-polar machines the bars of like phase belonging to like poles are joined to the same ring. This reduces the voltage to the minimum, and the potential difference between adjacent bars is very slight. Hence light insulation can be used, occupying little space, and a higher current density can be used, as the cooling can be made more effective. The weight of the unit for a given load is thus substantially reduced.

Figure 1:
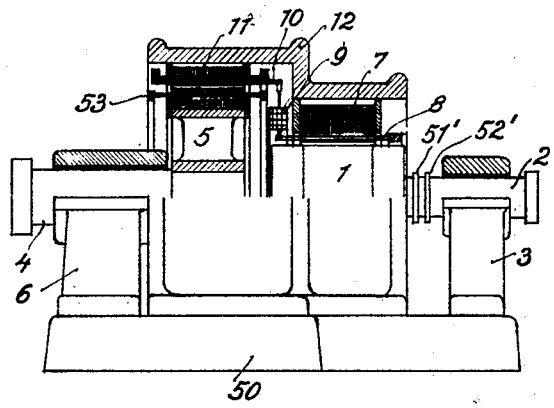

Referring to Figures 1, 6 and 7 of the drawings, the invention consists of an alternating current motor-generator unit comprising a base 50 on which is supported the single housing 12 carrying the generator stator 7 and the motor stator 11. The revolving field or generator rotor 1 is fixed to the drive shaft 2 supported by the bearing 3, and the cage rotor 5 of the motor is fixed to the driven shaft 4 supported by the bearing 6. The slip rings 51' and 52' are adapted to supply D. C. exciting current to the rotor 1.

Figure 3:
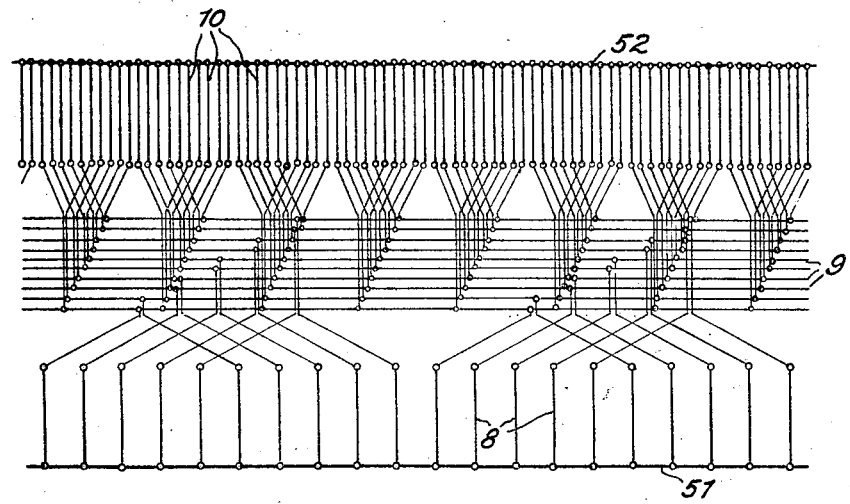
Figure 4:
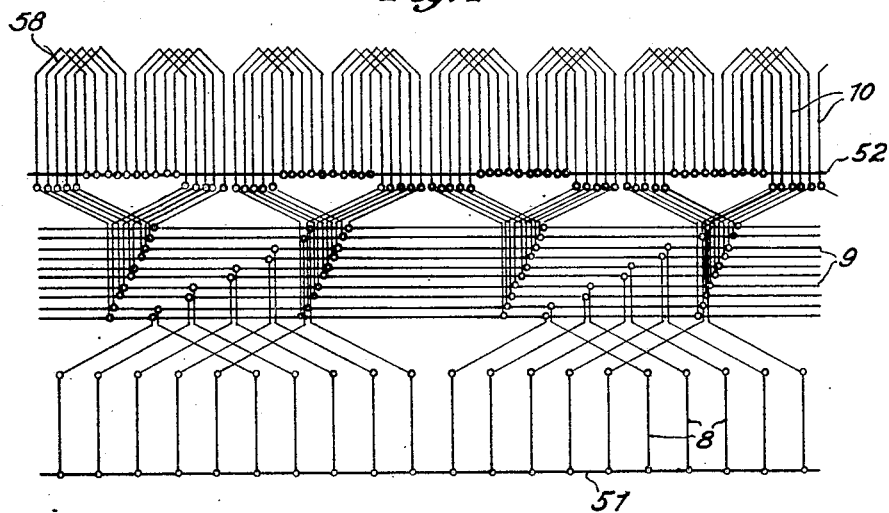

The generator stator bars 8, Figs. 3 and 6, are all connected at one end to the ring 51 and at the opposite end to the respective rings in the ring system 9 through the leads 56 as indicated in Figs. 3, 4 and 5.

The motor stator bars 10 are all connected at one end to the ring 52 and at the opposite end through the leads 57 to the respective rings in the ring system 9 as indicated in the wiring diagrams.

Figure 2:
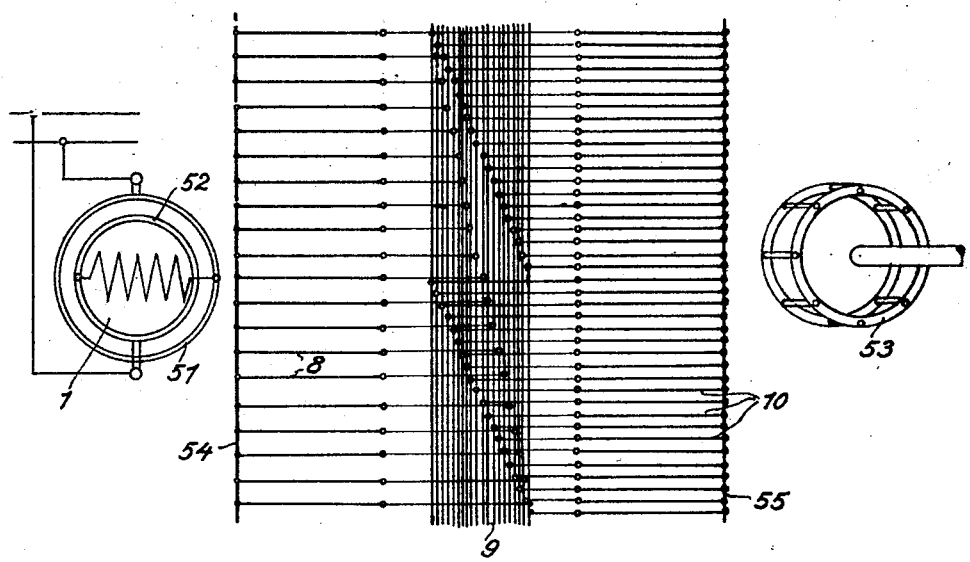

In the arrangement shown in Fig. 2 the bars 8 are connected at their outer ends to the common ring 54 and at their inner ends to successive rings 9. Likewise the bars 10 are connected together at their outer ends to the ring 55 and at their inner ends to the rings 9. The number of rings 9 is equal to the number of slots per pair of poles, the number of poles being two on the generator and four on the motor, the stators having 20 bars per pair of poles.

By using a larger number of slots for each pair of poles and also a larger number of rings, self induction and mutual induction of the rings may be eliminated by arranging like rings of opposite phase side by side and the junctions of like bars may also be arranged side by side.

The arrangement shown in Fig. 3 is used with a four-pole generator having 10 bars per pair of poles and a 16-pole motor. In Fig. 4 there is one bar per slot with two bars a pole pitch apart being connected in series in the motor. In Fig. 5 there are two bars in each motor slot with two bars a pole pitch apart arranged in series.

Figure 9:
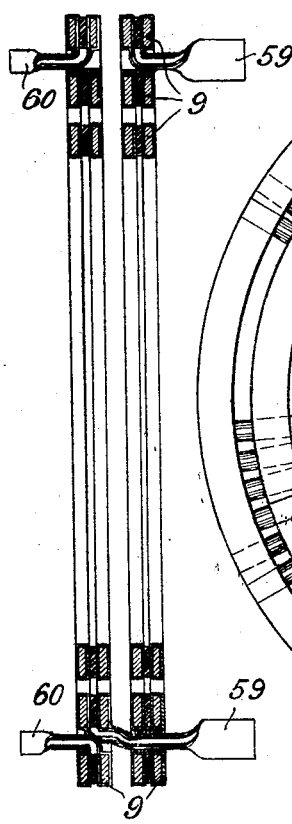
Figure 8:
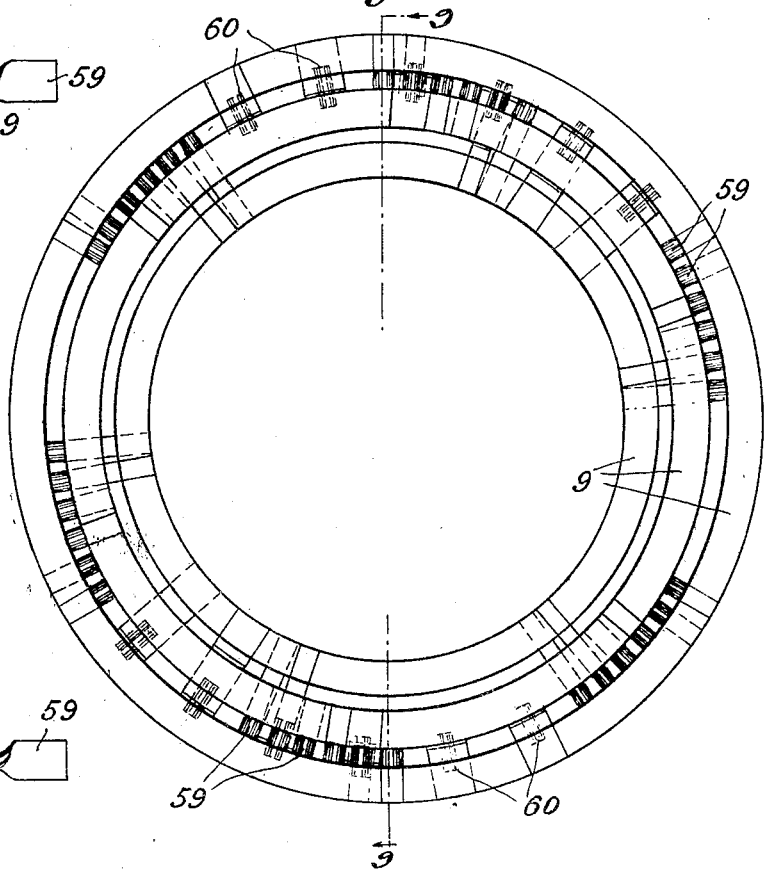

In Figs. 8 and 9 are shown in detail the non-inductive arrangement of the rings and the manner in which the connections 59 and 60 are brought out from the respective rings of the ring system 9 for connection to the leads 56 and 57 from the stator bars 8 and 10.

Figs. 6 and 7 show an embodiment of the invention similar to that in Figure 4. The generator 7 is of the alternating type having the ordinary rotating field rotor 1 supplied with direct current through slip rings (not shown). The stator winding 8 is four polar with 12 slots for each pair of poles.

The motor stator winding 10 is twelve polar with every two opposed bars of like phase arranged one behind the other. The twelve rings 9 are closely arranged every two rings of like phase being placed opposite each other. The generator bars 8 are connected with the rings 9 by the leads 56, and the bars 10 are connected to the rings 9 by the leads 57. The adjacent ends of the bars 10 in the same slot are joined at 58.

Fig. 7 shows a section between the generator and the motor with the ring system on the generator side visible by omitting the connecting parts between the motor and generator housing which, as shown, is in two parts.

In the modification shown in Fig. 10 the stators 7 and 11 are bolted together to form a single unit which is rotatably mounted in the bearing supports 3 and 13 on ball bearings 61 and 62. The bearing 13 also carries the motor rotor 5 keyed to a hollow shaft 15 which is rotatable on the ball bearings 63. The wiring connections between the stators 7 and 11 are the same as those shown and described in connection with Figs. 6 and 7. The main distinguishing feature of this form of the invention over the others resides in the rotatable stator and the provision of a plurality of magnetic clutches cooperating with the rotatable members of the motor-generator unit.

The clutch member 24 is bolted to the bedplate of the machine and its companion member 23 is secured to the housing 12.

The clutch member 25 is also bolted to the bedplate and its companion member is secured to the hollow shaft 15 of rotor 5.

The clutch member 16 is also secured to the shaft 15 with its companion member 17 secured in the bracket 64 keyed to the driven shaft 4.

The clutch members 21 and 22 are arranged to interconnect the shafts 19 and 4 through the bracket 64.

For forward or direct drive between the prime mover and its load the housing 12 is coupled with the shaft 4 through the clutch 21, 22, the rotor 5 being held fast by the clutch 25, 26, since the housing 12 is bolted to the disk 20 which is keyed on the inner shaft 19.

For reverse drive the clutch 21, 22 is disengaged, the clutch 25, 26 being also disengaged, and the rotor 5 is coupled with the shaft 4 by means of the clutch 16, 17; the housing 12 carrying the stators 7, 11 being held fast by clutch 23, 24. The rotor 5 then revolves in the same direction as the rotor 1 of the generator. In the arrangement just described the ratio of speeds between shafts 2 and 4 is proportional to the ratio of the poles in the stators of the motor and generator.

Figure 12:
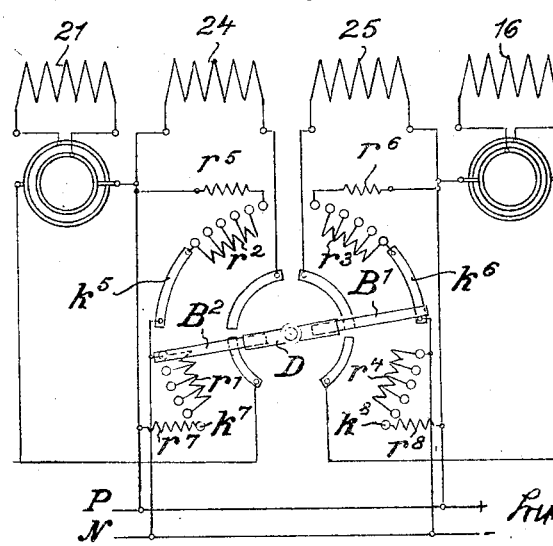
Fig. 12 is a wiring diagram of the electrical circuit between the coils of the electromagnetic clutches and a control rheostat.

Fig. 12 shows a diagram of connections between a control rheostat and the magnetizing coils of the respective electro-magnetic clutches in which the numerals 21, 24, 25 and 16 designate the coils in the corresponding clutches shown in Fig. 10. The pivoted lever D of the rheostat carries two insulated brushes $B'$ and $B^2$ adapted to make wiping contact with points connected to resistance units $r'$, $r^2$, $r^3$, and $r^4$ and also with the connectiong strips $k^5$ and $k^6$ and points $k^7$ and $k^8$ connected to resistance $r^7$ and $r^8$.

The rheostat thus controls the current supply to the magnetizing coils of the respective clutches whereby they may be engaged or disengaged to control the relative rotation of the stators, rotors and shafts of the unit.

What is claimed is:

1. An electric speed reduction mechanism for power transmission comprising a generator and an induction motor both of the polyphase alternating current type, the stators of said generator and motor being fixed to each other and mounted for rotation as a unit, a polyphase ring system comprising a plurality of annular conductors non-inductively associated and adapted for connecting the conductor bars of the induced generator member with the conductor bars of like phase of the induced member of the motor, said induced members being independently rotatable.

2. An electric speed reduction mechanism for power transmission comprising a driving member, a driven member, an electric generator having its rotor connected to said driving member, an induction motor, said generator and motor being both of the polyphase alternating current type and having their stators oppositely wound, the stators of said generator and motor being fixed to each other, means to connect said stators to the driven member, clutch means between the motor rotor and a stationary member, and polyphase electrical connections between the conductor bars of like phases on the stator members.

3. An electric speed reduction mechanism for power transmission comprising a driving member, a driven member, an electric generator having its rotor directly connected to the driving member, an induction motor, said generator and motor being both of the polyphase alternating current type and having their stators oppositely wound and fixed to each other, means for rotatably mounting said stators, means rigidly connecting the stators to the driven member, clutch means between said stators and a fixed member, clutch means between the motor rotor and the fixed member, a plurality of annular conductors forming a ring system, and polyphase electrical connections between the ring system and the conductor bars on the respective stators.

4. An apparatus of the class described comprising driving and driven members, means for varying the speed ratio of said members including an electrical motor-generator unit of the polyphase alternating current type, the stators of the motor and generator being fixed to each other and mounted for rotation as a unit, and a polyphase ring system having its rings non-inductively associated and adapted for interconnecting the conductor bars of the respective stators whereby to transmit electrical power from the generator to the motor at the potential induced in the bar or bars in each slot of the generator stator.

In testimony whereof, I have signed this specification.

FRANZ BRÜGGEMANN.